United States Patent [19]
Willett et al.

[11] 3,772,609
[45] Nov. 13, 1973

[54] LASER CAVITY CONFIGURATION YIELDING DUAL OUTPUT BEAM

[75] Inventors: Colin S. Willett, Keedysville; John S. Kruger, Rockville, both of Md.

[73] Assignee: The United States of America as represented by the Secretary of the Army, Washington, D.C.

[22] Filed: June 30, 1972

[21] Appl. No.: 267,885

[52] U.S. Cl. .............................................. 331/94.5
[51] Int. Cl. ............................................... H01s 3/08
[58] Field of Search ..................... 331/94.5; 356/112

[56] References Cited
UNITED STATES PATENTS
3,492,600   1/1970   Zitter ................................. 331/94.5

Primary Examiner—William L. Sikes
Attorney—Harry M. Saragovitz et al.

[57] ABSTRACT

A laser cavity configuration which enables a single laser medium (gas, liquid or solid) to give an output at least one wavelength from one end of the laser and another output at different wavelengths from the other end of the laser. Disclosed are several well known laser media which are capable of simultaneous laser oscillation at two or more wavelengths. Mirrors which are highly reflective at one of such wavelengths and highly transmissive at another of such wavelengths can be prudently selected to resonate the emission from an active medium. If each of the two mirrors thus required are optimized for reflectivity at one of the wavelengths and transmissivity at the other, the desired effect will result.

3 Claims, 1 Drawing Figure

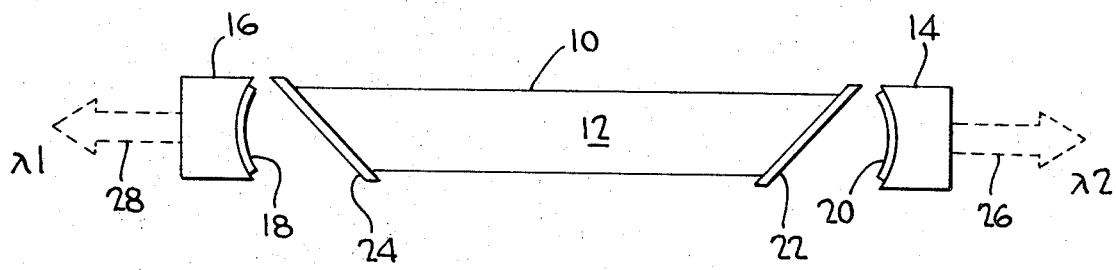

LASER CAVITY CONFIGURATION YIELDING DUAL OUTPUT BEAM

RIGHTS OF THE GOVERNMENT

The invention described herein may be manufactured, used, and licensed by or for the United States Government for governmental purposes without the payment to us of any royalty thereon.

BACKGROUND OF THE INVENTION

1. Field of the Invention

This invention relates to lasers, and more particularly to a laser cavity configuration that enables dual simultaneous emission of different wavelength laser beams from the same active medium.

2. Description of the Prior Art

The availability of a multiplicity of different wavelength outputs from a single lasing medium has been heretofore recognized. However, the method of coupling out the two or more beams has been less than completely satisfactory. The reflectivities of the mirrors utilized to enclose a laser cavity must be carefully selected in order to sustain laser oscillation. Obviously, when a different wavelength is desired as an output from the same laser medium, the reflectivities of the mirrors must be changed in order to sustain oscillation at the new wavelength. When integral mirrors which are permanently affixed to the laser plasma tube are utilized, as is ever increasingly the case, the changeover to mirrors of different reflective properties becomes extremely difficult and expensive to accomplish. An alternative to the requirement of changing mirrors is illustrated in U.S. Pat. No. 3,599,117, wherein a compound mirror is illustrated having one portion thereof specifically designed to reflect one wavelength and a concentric outer portion specifically designed to reflect the other wavelength present in the dual beam emission. Unfortunately, the compound mirror so described tends to provide widely divergent output beams which is most undesirable in certain precision applications.

It is therefore one object of the present invention to provide a laser cavity configuration that allows the dual simultaneous emission of two laser beams of differing wavelengths that eliminates the necessity of changing the mirrors of the resonant cavity to produce the desired result.

Another object of the present invention is to provide a cavity configuration that allows dual simultaneous emission of differing wavelength laser beams without the need for compound mirrors whereby the desired beam width can be more accurately controlled.

An additional object of the present invention is to provide a laser cavity configuration that permits two laser beams at differing wavelengths to be emitted from the same lasing medium that is straightforward, simple to construct and maintain, and produces the desired result without expensive calibration or alignment procedures.

A still further object of the present invention is to provide a dual laser output at two or more different wavelengths that is asymmetrical in which in one embodiment one output is emitted from one end of a laser cavity, whereas the second output is emitted from the opposite end of the laser cavity.

SUMMARY OF THE INVENTION

Briefly, in accordance with the invention, a laser cavity configuration is provided that allows the emission of two laser beams at differing wavelengths, which comprises an active laser medium with appropriate excitation means, said active medium capable of laser oscillation at at least two wavelengths, and at least a pair of mirrors for reflecting the stimulated radiation back and forth the required number of times to sustain laser oscillation and emission. In a preferred embodiment, two mirrors are selected to have nearly inverse reflectivity characteristics, depending on the feedback necessary to sustain oscillation of the two different wavelengths under consideration. In other words, one mirror will have a high reflectivity at one wavelength and a low reflectivity at the second wavelength, whereas the mirror at the other end of the plasma tube will have a high reflectivity at the second wavelength and a low reflectivity at the first wavelength. By a suitable choice of the reflectivity of the coatings on both cavity mirrors, it is possible to obtain two wavelength outputs with both superradiant laser transitions and low gain laser transitions, either in pulsed or continuous systems. The requirement is basically that the reflectivities be high enough to yield simultaneous laser oscillation at both desired wavelengths, yet allow sufficient radiation to be coupled out.

BRIEF DESCRIPTION OF THE DRAWING

The specific nature of the invention as well as other objects, aspects, uses, and advantages thereof will clearly appear from the following description and from the accompanying drawing, in which:

The FIGURE is a partially schematic side view of a laser cavity configuration embodying the principles of the present invention.

DESCRIPTION OF THE PREFERRED EMBODIMENTS

In the device of the present invention, an asymmetrical laser output is possible in either a superradiant or low-gain laser system which will yield a laser beam of at least one wavelength from one end of the laser (under optimum output coupling) and another laser beam of differing wavelengths from the other end. The basic requirement is that the output coupling of the mirrors at either end be chosen to be an optimum for the particular wavelengths emitted therefrom. The basic cavity arrangement is straightforward and is illustrated in the FIGURE by a preferred embodiment wherein 10 represents a laser cavity structure containing an active laser medium 12 that may be a gas, liquid or solid. If the active medium is gaseous, cavity structure 10 represents a plasma tube, at each end of which are disposed Brewster's windows 22 and 24. Located outside windows 22 and 24 are mirror blanks 14 and 16, respectively, which have mirror coatings 20 and 18, respectively, located thereon. Laser medium 12 is selected to be a material that is known to lase at at least two differing wavelengths, say $\lambda_1$ and $\lambda_2$. Mirror 16 has coating which has a high reflectivity at wavelength $\lambda_2$ but lower reflectivity at the other possible laser wavelength $\lambda_1$. Additionally, mirror 14 has a coating 20 having a high reflectivity at wavelength $\lambda_1$ and a lower reflectivity at wavelength $\lambda_2$. The respective beams at wavelengths $\lambda_1$ and $\lambda_2$ will therefore exit through the mirror exhibiting the lower reflectivity at their respective wavelengths. Thus, the laser beam 28 having wavelength $\lambda_1$ will exit via mirror 16, whereas the laser beam 26 having wavelength $\lambda_2$ will exit via its lower reflectivity mirror 14. Coatings 18 and 20 of laser mirrors 16 and 14, respectively, that will satisfy the requirements of high reflectivity at one wavelength and low reflectivity at another can be fabricated by an ordinarily skilled technician in the art.

The aforedescribed system finds particular use in high gain, superradiant laser systems. These pulsed gas lasers exhibit superradiance as a result of their extremely high gain, which can run as high as 1,000,000 per meter of discharge. These lasers are characterized by a long-lived lower laser level and an upper laser level that is preferentially excited and is connected to the ground state by a strong ultraviolet or resonance transition. Typical of materials that oscillate superradiantly are helium, neon, argon, krypton, xenon, lead, copper, calcium, thallium, strontium, manganese, and nitrogen. These self-terminating lasers require short excitation pulses having rise times on the order of a few to tens of nanoseconds and can be operated without any feedback, but work best with one mirror highly reflecting and another mirror (the output mirror) having a reflectivity of as little as 10 percent. Because of the high transmission of the output mirror and the high reflectivity of the other cavity mirror, if the material is chosen to be one under which a dual wavelength oscillation is possible, then simultaneous laser oscillation at the two or more wavelengths will occur in the device of the present invention. Examples of the foregoing would be found in a neon-nitrogen laser operating in the visible spectrum at 5401-A. and 3371-A.; in a neon-hydrogen laser to give an output from one end of the cavity at a wavelength of 4861-A. and at the other end at 4340-A.; in a pure neon laser, output at 5401-A. would be achievable at one end and 5944-A. (or 6143-A.) would be available from the other end.

The particular laser configuration of the present invention as well as working with superradiant laser transitions, makes it possible, by a suitable choice of the reflectivity of the coatings on both cavity mirrors, to obtain two wavelength outputs with low gain laser transitions. The requirement is simply that the reflectivities be high enough to yield simultaneous laser oscillation at both desired wavelengths. The configuration can be utilized even with laser transitions which compete for upper laser level populations. An example can be found in the common 0.633 $\mu$m (red) and the 3.39 $\mu$m (infrared) helium-neon laser lines. Orindarily, the efficiency for oscillation at 0.633 $\mu$m is lost when the high gain 3.39 $\mu$m line is allowed to lase. However, when utilizing the device of the present invention, both outputs can be simultaneously optimized by careful selection of combined mirror reflectivities. For example, with respect to the FIGURE, mirror 16 and its coating 18 would be optimized for output reflectivity between 95 and 99.9 percent at 0.633 $\mu$m, whereas its reflectivity at 3.39 $\mu$m can be as low as 10 to 15 percent. Mirror blank 14 and its coating 20, on the other hand, could have a 100 percent reflectivity at 0.633 $\mu$m and around 10 percent reflectivity at 3.39 $\mu$m. Mirror blank 14 can be made of fused silica which has special transmissive properties in the infrared region of the spectrum. Thus, the 3.39 $\mu$m beam, represented by 26, will be emitted via mirror 14, and the 0.633 $\mu$m beam, represented by 28, will exit via mirror 16. The low reflectivity of both mirrors with respect to the infrared laser line is the result of the greater feedback necessary to stimulate the emission of the red line.

Continuous outputs are also realizable from the cavity configuration of the present invention. Examples include the 0.633 $\mu$m line from the $3s_2-2p_4$ transition and the 1.15 $\mu$m line from the $2s_2-2p_4$ transition in neon. In the foregoing example, the reflectivities of the mirror coatings can be optimized to give one of the wavelengths from one end of the laser cavity and the other wavelength from the opposite end, inasmuch as the two lines do not compete for upper laser level populations. Having a common lower laser level does not affect their simultaneous operation. Additionally, since the wavelengths are not in a 2:1 ratio, double operation at the two wavelengths is possible with the mirror coatings being optimized for their respective wavelength reflectivities. The helium-neon mixture ratio can be made about 7:1 to make it suitable for producing population inversion at the two wavelengths. Another possible combination of continuous laser outputs would be available from the helium-xenon laser operating at 2.02 and 3.5 $\mu$m simultaneously. The gain in the transitions involved can be high (supperradiant), and it is noted that these lines do not compete with one another. This combination would be especially apposite in the device of the present invention, inasmuch as the 2.02 $\mu$m line usually has lower gain than the 3.5 $\mu$m line; thus, the reflectivity at 2.02 $\mu$m on the 3.5 $\mu$m output mirror must be higher than the reflectivity at the 2.02 $\mu$m output mirror.

The configuration of the present invention can be utilized for continuous metal vapor lasers such as the helium-cadmium laser which would then yield a blue (0.4416 $\mu$m) or ultraviolet (0.3250 $\mu$m) output from one end of the laser cavity, and a green (0.5378 and/or 0.5338 $\mu$m) or ultraviolet (0.3250 $\mu$m) output from the other end. Another suitable combination of wavelengths would be a red output (0.6355 $\mu$m) at one end and the green lines mentioned above at the other end.

One attendant advantage of the configuration as described above is the elimination of the necessity of changing mirrors to get different output wavelengths from a given plasma. This is particularly significant when integral mirrors are permanently affixed to the plasma tube. Our technique allows one output to be taken from the other end of the laser whenever its wavelength is desired alone. It is quite evident that unless the gains for the lines on which oscillation is desired are very low, the technique has a wide application to continuous lasers as well as to pulsed and/or superradiant lasers. The configuration is no means restricted to gas lasers, but can be utilized for all laser media with feedback mirrors and reflectivities properly chosen. The technique can be extended to more than two output mirrors with different reflectivity coatings on each when more than two laser lines can oscillate in the same medium, provided the separations between lines can fit the separations between low and high reflectivity bands of mirror coatings.

Additionally, this device will enable the output of one laser beam to be monitored utilizing the other. This means that one wavelength can be chosen as the monitor wavelength and the other used as the output beam without any necessity to sample the output beam directly, provided, of course, that their intensities are related. In this manner, the monitor wavelength can be chosen to match the peak response of the best available detector.

It is to be understood that we have illustrated the principles of the present invention primarily by preferred embodiments showing the emission of dual beams at only two differing wavelengths. It is well understood by those versed in the art that more than two wavelengths will be easily obtainable in output beams of the present invention by corresponding adjustment in the mirror coating reflectivities. Therefore, we wish it to be understood that we do not desire to be limited to the exact details of construction shown and described, for obvious modifications will occur to a person skilled in the art.

We claim as our invention:

1. A cavity configuration for stimulating the emission of radiation and for allowing the simultaneous oscillation and subsequent emission of first and second laser beams having at least first and second wavelengths, respectively, comprising an active laser medium and first and second means for reflecting said stimulated radiation back within said medium, said reflecting means located one at each end of said active medium which together therewith define a resonant cavity, said first reflecting means having a higher reflectivity at said first wavelength than said second reflecting means, and said second reflecting means having a higher reflectivity at said second wavelength than said first reflecting means, whereby said first laser beam will be emitted from said cavity through said second reflecting means and said second beam will be emitted from said cavity through said first reflecting means.

2. The invention according to claim 1 wherein said active laser medium is selected from the group consisting of neon, nitrogen, hydrogen, argon, helium, lead, copper, mercury, xenon and cadmium.

3. The invention according to claim 1 wherein said active laser medium comprises a superradiant laser material.

* * * * *